United States Patent
Sun et al.

(10) Patent No.: US 7,388,994 B2
(45) Date of Patent: Jun. 17, 2008

(54) METHOD FOR REDUCING IDCT CALCULATIONS IN VIDEO DECODING

(75) Inventors: Shijun Sun, Vancouver, WA (US); Shwmin Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 11/805,172

(22) Filed: May 22, 2007

(65) Prior Publication Data

US 2007/0223828 A1  Sep. 27, 2007

Related U.S. Application Data

(62) Division of application No. 10/397,120, filed on Mar. 25, 2003, now Pat. No. 7,233,703.

(51) Int. Cl.
*G06K 9/36* (2006.01)
*G06K 9/46* (2006.01)

(52) U.S. Cl. ........................ 382/250; 382/239
(58) Field of Classification Search ............... None
See application file for complete search history.

(56) References Cited

U.S. PATENT DOCUMENTS

| | | | | |
|---|---|---|---|---|
| 5,371,549 A | * | 12/1994 | Park ........................ | 348/564 |
| 5,646,686 A | * | 7/1997 | Pearlstein ................ | 348/392.1 |
| 5,835,151 A | * | 11/1998 | Sun et al. ................ | 348/441 |
| 6,704,358 B1 | * | 3/2004 | Li et al. ................ | 375/240.02 |
| 6,788,347 B1 | * | 9/2004 | Kim et al. ................ | 348/441 |
| 6,792,149 B1 | * | 9/2004 | Florencio ................ | 382/233 |
| 2002/0122601 A1 | * | 9/2002 | Peng ........................ | 382/250 |

OTHER PUBLICATIONS

Chen et al, "Regulated Complexity Scalable MPEG-2 Video Decoding for Media Processors", IEEE Transactions on Circuits and Systems for Video Technology, vol 12, No. 8, Aug. 2002, pp. 678-687.*

* cited by examiner

*Primary Examiner*—Wenpeng Chen
*Assistant Examiner*—Yuzhen Ge
(74) *Attorney, Agent, or Firm*—Law Office of Gerald Maliszewski; Gerald Maliszewski

(57) ABSTRACT

Reduced complexity inverse discrete cosine transform (IDCT) masks and a method for reducing the number of IDCT calculations in video decoding are provided. The method comprises: accepting an n×m matrix of DCT coefficients; performing (n−y) horizontal IDCT operations, where y is greater than 0; performing y scaling operations; and, generating an n×m block of pixel information. Some aspects of the method further comprise: performing (m−z) vertical IDCT operations, where z is in the range between 0 and m/2. In some aspects, performing (n−y) horizontal ICDT operations includes performing IDCT operations for the first (n−y) horizontal rows. Then, performing y scaling operations includes: selecting the DC component from the first position of each horizontal row; scaling the selected DC component; and, copying the scaled DC component into the remaining positions of each of horizontal row.

8 Claims, 5 Drawing Sheets

Fig. 1 *(PRIOR ART)*
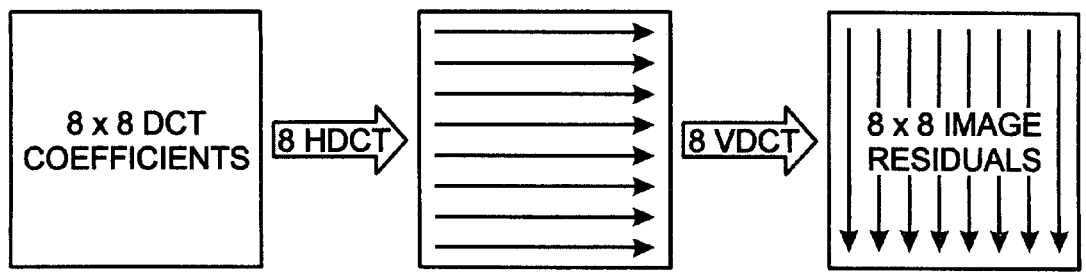
2D-IDCT PROCESS
Fig. 2 *(PRIOR ART)*
EXAMPLES OF DCT MASKS: 6 x 6, 4 x 8, 4 x 4
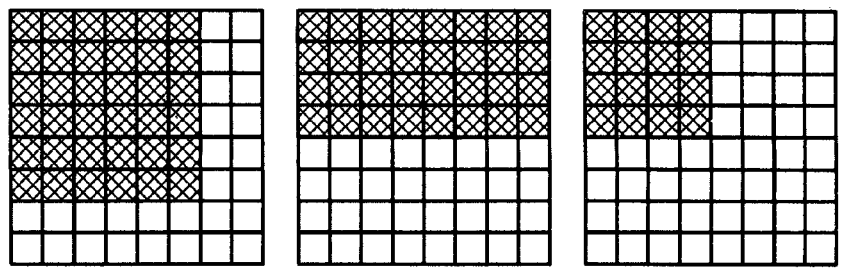
Fig. 3
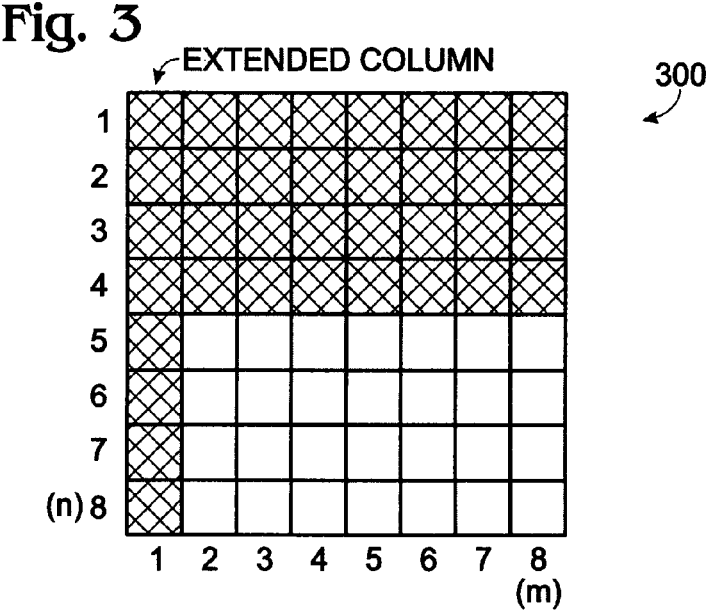

EXTENDED ROW

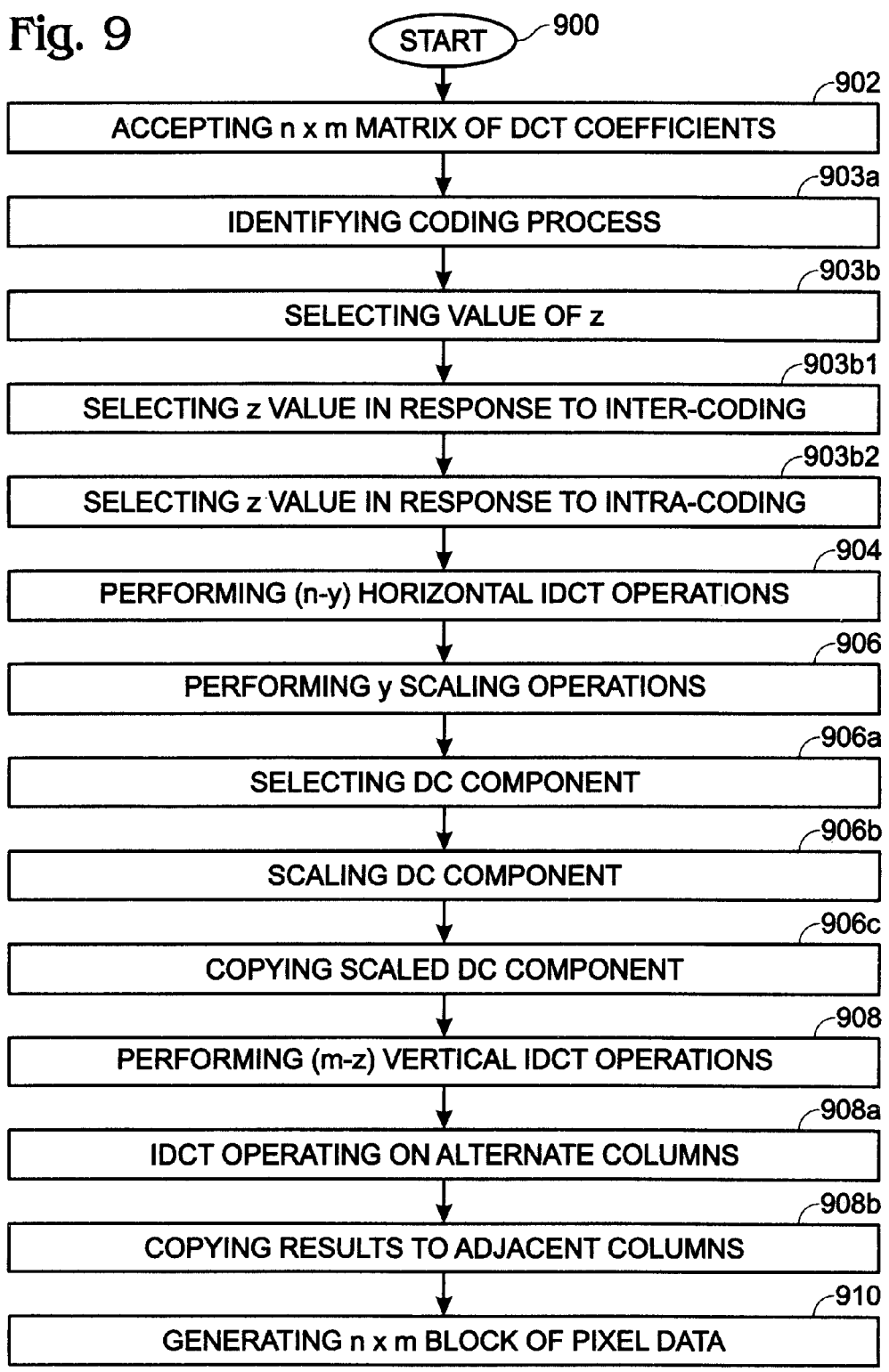

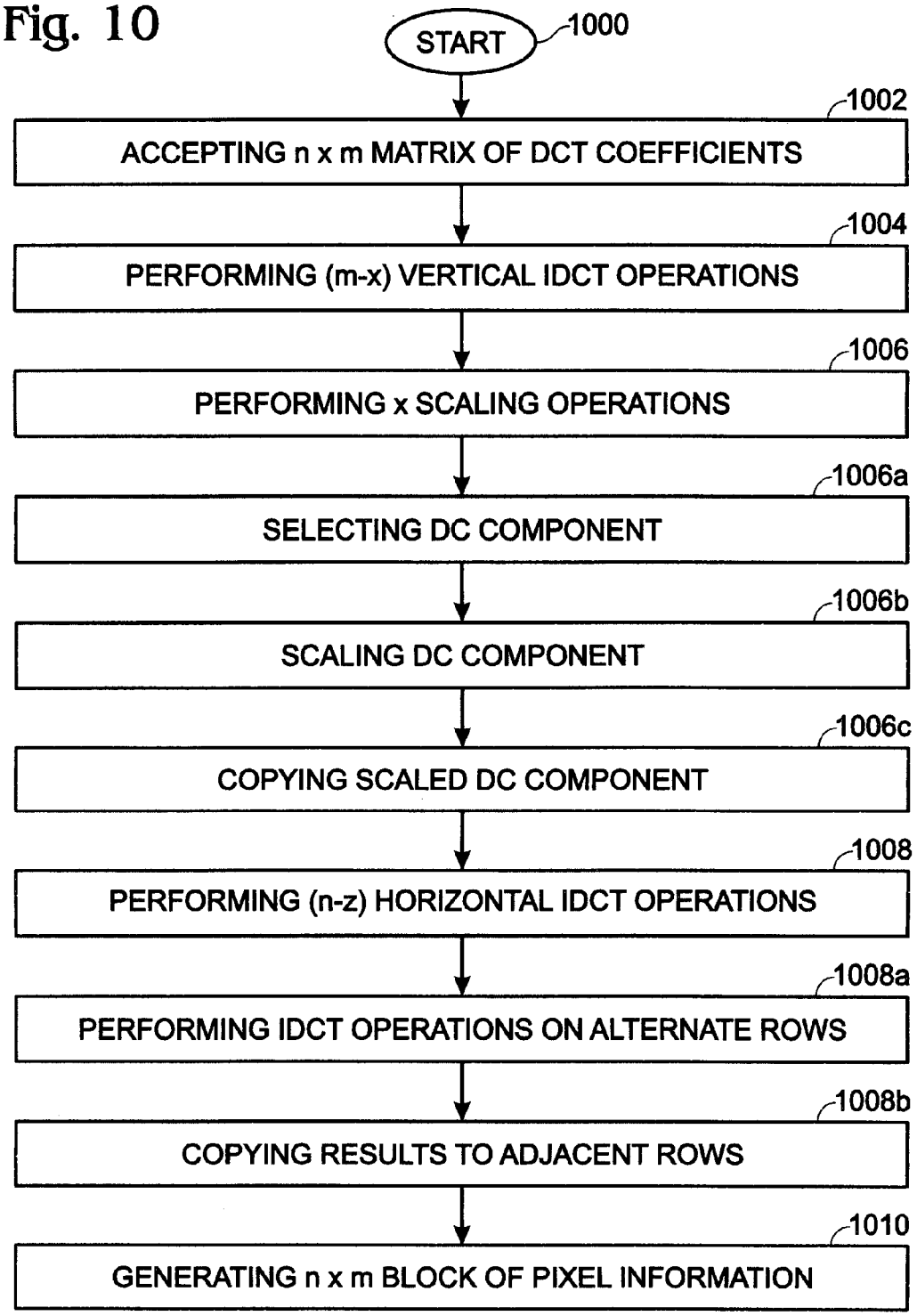

METHOD FOR REDUCING IDCT CALCULATIONS IN VIDEO DECODING

RELATED APPLICATIONS

This application is a Divisional of a application entitled, COMPUTATION-REDUCED IDCT METHOD FOR VIDEO CODING, invented by Sun et al., U.S. Ser. No. 10/397,120, filed on Mar. 25, 2003, now U.S. Pat. No. 7,233,703 which is incorporated herein by reference.

BACKGROUND OF THE INVENTION

1. Field of the Invention

This invention generally relates to video decoding and, more particularly, to a method for maintaining relatively lossless video decoding using computation-reduced inverse discrete cosine transformation process.

2. Description of the Related Art

Complexity-scalable image/video decoding techniques are essential to applications where computation power is limited, and/or full resolution quality images are not necessary. Discrete cosine transform (DCT) processes are used in many popular image/video-coding systems, such as JPEG, MPEG-1-2-4, and H.263 systems. Inverse discrete cosine transform (IDCT) processing is widely recognized as one of the most computation-demanding processes of the image/video decoders. Conventionally, the approaches have been developed to simplify the IDCT process and save computation result in a trade off of added visual artifacts and a loss of resolution.

FIG. 1 is a drawing that illustrates a conventional two-dimensional (2D) 8×8 IDCT process (prior art). The 8×8 DCT coefficients undergo 8 horizontal one-dimensional (1D) IDCT transforms, followed by 8 vertical 1D IDCT transforms, to generate 8×8 image residuals in the space domain. In total, 16 1D IDCT operations are needed. Since the horizontal and vertical transforms are independent of each other, the same result is achieved if the process is begun with the vertical transforms and finished with horizontal transforms. The following discussion, however, will follow the process explicitly depicted in FIG. 1

The key to computation reduction is in the reduction of the number of 1D IDCT operations. The most straightforward way to reduce the number of IDCT computations is to set some of the high frequency DCT coefficients to zero value.

FIG. 2 depicts a few examples of reduced complexity DCT coefficient masks (prior art). The coefficients in the non-shaded area are set to zero value to reduce computation complexity. For example, when the 4×8 mask is applied, the resultant 2D IDCT process requires 4 horizontal and 8 vertical IDCT operations. In total, 12 1D IDCT operations are required. However, as we mentioned above, the trade-off associated with a reduction in complexity is the degradation of visual quality. The visual artifacts become very annoying when strong image edges (such as the letter box boundary in movie materials) are present. For example, using a reduced complexity mask to decode a frame with a letter box boundary may result in the appearance of dark stripes in the image. These stripes are artifacts of the letter box boundary.

It would be advantageous if a reduced complexity IDCT process could be developed that didn't significantly degrade the decoded video image.

SUMMARY OF THE INVENTION

The present invention introduces a method that significantly reduces the number of IDCT computations required to decode a matrix of DCT coefficients, while maintaining reasonable image visual quality.

Accordingly, a method is provided for reducing inverse discrete cosine transform (IDCT) calculations in video decoding. The method comprises: accepting an n×m matrix of DCT coefficients; using an extended (n−y)×(m−x) DCT mask, inverse transforming the DCT coefficients, where x is greater than, or equal to 0, and y is greater than 0. Typically, the values of n and m=8. However, the method is not limited to any particular value.

In some aspects, inverse transforming the DCT coefficients using an extended (n−y)×(m−x) DCT mask includes using a mask with all the n DCT coefficients in the first column of the n×m matrix.

In other aspects, another method is provided for reducing inverse discrete cosine transform (IDCT) calculations in video decoding. The method comprises: accepting an n×m matrix of DCT coefficients; performing (n−y) horizontal IDCT operations, where y is greater than 0; performing y scaling operations; and, generating an n×m block of pixel information in response to the horizontal operations.

Some aspects of the method further comprise: performing (m−z) vertical IDCT operations, where z is in the range between 0 and m/2. Then, generating an n×m block of pixel information includes generating an n×m block of pixel information in response to the vertical IDCT operations.

In some aspects, performing (n−y) horizontal ICDT operations includes performing IDCT operations for the first (n−y) horizontal rows. Then, performing y scaling operations includes: selecting the DC component from the first position of each horizontal row; scaling the selected DC component; and, copying the scaled DC component into the remaining positions of each of horizontal row.

Additional details of the above-described methods are provided below.

BRIEF DESCRIPTION OF THE DRAWINGS

FIG. 1 is a drawing that illustrates a conventional two-dimensional (2D) 8×8 IDCT process (prior art).

FIG. 2 depicts a few examples of reduced complexity DCT coefficient masks (prior art).

FIG. 3 is a diagram illustrating the present invention reduced complexity mask for inverse discrete cosine transform (IDCT) video decoding.

FIG. 9 is a flowchart illustrating a third aspect of the present invention method for reducing IDCT calculations in video decoding.

FIG. 10 is a flowchart illustrating a fourth aspect of the present invention method for reducing IDCT calculations in video decoding.

DETAILED DESCRIPTION OF THE PREFERRED EMBODIMENTS

FIG. 3 is a diagram illustrating the present invention reduced complexity mask for inverse discrete cosine transform (IDCT) video decoding. The mask 300 comprises (m−x) vertical columns, including at least one extended column. The mask overlies an n×m matrix of DCT coefficients. With respect to the mask 300, x is greater than, or equal to 0. The shaded areas represent the mask 300. (n−y) horizontal rows overlie the n×m matrix of DCT coefficients, where y is greater than 0. In this example, n=m=8, y=4, and x=0. Note that the present invention is not limited to any particular number values.

As shown, the extended vertical column includes greater than (n−y) DCT coefficients. Typically, the extended vertical column includes greater than (n−y) DCT coefficients in the first column of the n×m matrix. As shown, the extended vertical column includes all the n DCT coefficients in the first column of the n×m matrix.

Figure 4:
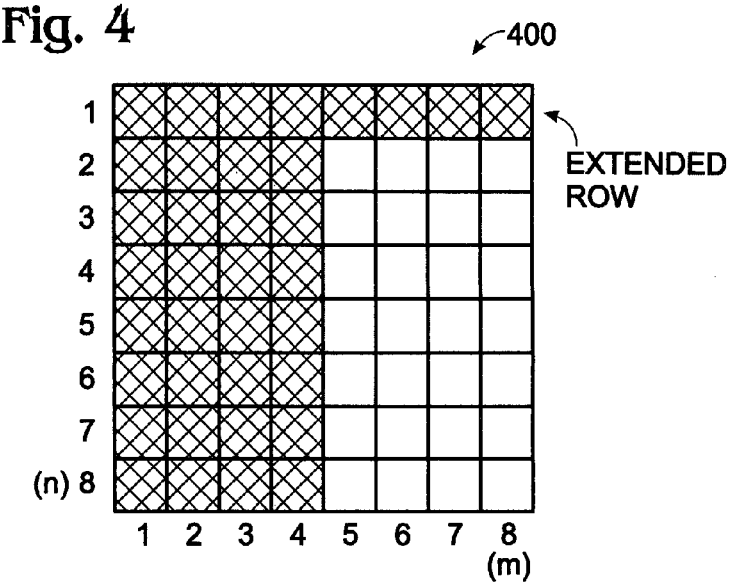
FIG. 4 is a diagram illustrating another aspect of the present invention reduced complexity mask for IDCT video decoding.

FIG. 4 is a diagram illustrating another aspect of the present invention reduced complexity mask for IDCT video decoding. The mask 400 comprises (m−x) vertical columns overlying an n×m matrix of DCT coefficients, where x is greater than 0. The shaded areas represent the mask 400. (n−y) horizontal rows overlie the n×m matrix of DCT coefficients, including at least one extended horizontal row, where y is greater than, or equal to 0. In this example, n=m=8, y=0, and x=4. Note that the present invention is not limited to any particular number values.

As shown, the extended horizontal row includes greater than (m−x) DCT coefficients. Typically, the extended horizontal row includes greater than (m−x) DCT coefficients in the first row of the n×m matrix. As shown, the extended horizontal row includes all the m DCT coefficients in the first row of the n×m matrix.

Functional Description

Figure 5:
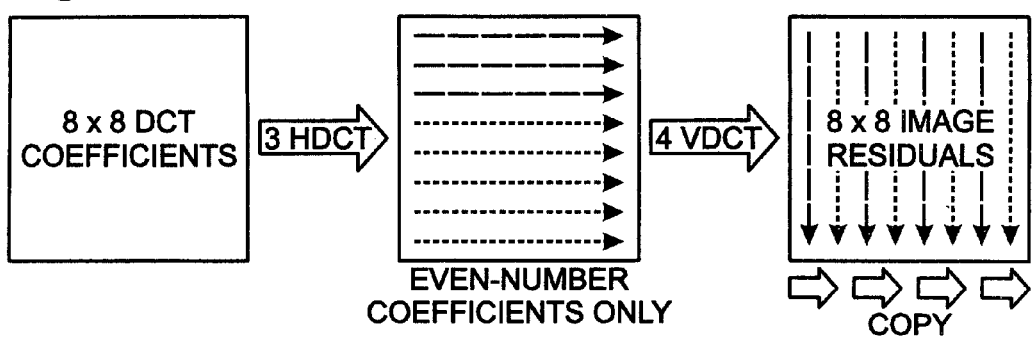
FIG. 5 illustrates the present invention 2D IDCT methodology.

FIG. 5 illustrates the present invention 2D IDCT methodology. The example represented by FIG. 5 uses 3 horizontal and 4 vertical 1D IDCT operations. In total, 7 1D IDCT operations are used to complete the 2D 8×8 IDCT. The difference between the present invention and conventional methods is as follows. With respect to the horizontal transforms, the dotted lines indicate that only the DC coefficient of each line is considered. The computation required for the operation can be accomplished by using a simple "shift" instruction. The corresponding complexity is negligible comparing to a full IDCT operation. For the vertical transform, the dotted lines indicate that no IDCT operation is necessary. The image residuals are simply a copy of the neighboring-left column. Since only 4 vertical 1D IDCT operations are performed, only the 4 (even-number) output values are calculated during horizontal transforms.

The 1D IDCT operations are further simplified. Assuming $c[k]$ with $k=[0,7]$ represents the 8 DCT coefficients. When $c[1]=c[2]=c[3]=0$, only the DC coefficient $c[0]$ is considered, as described above, through "shift" instructions. Alternately stated, the dotted lines of the horizontal transforms indicate that only DC coefficients are used. The dotted lines of the vertical transforms indicate that only "copy" operations are applied. The present invention method provides a scalable IDCT control responsive to the number of 1D IDCT operations that are skipped.

Figure 6A:
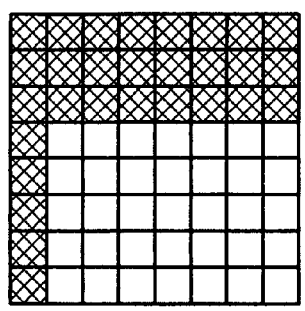
FIGS. 6a and 6b illustrate IDCT coefficient mask examples.
Figure 6B:
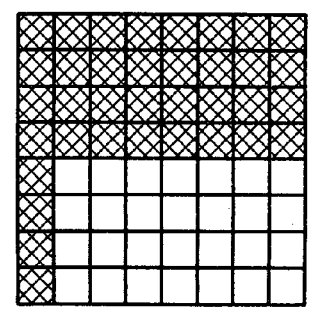

FIGS. 6a and 6b illustrate IDCT coefficient mask examples. The process described in FIG. 5 results in the mask depicted in FIG. 6a. FIG. 6b is another example of IDCT coefficient mask. In the example of FIG. 6b, a total 8 1D IDCT operations are needed to complete the 2D 8×8 IDCT process. The mask of FIG. 6b generally results in a better quality image than image provided by the mask of FIG. 6a, in response to the greater number of IDCT operations.

Further, the present invention IDCT methodology is flexible. For example, when the decoded video picture is to be downsized in both horizontal and vertical directions for display or other purpose, the present invention method, such as demonstrated in FIGS. 5 and 6a, can be used for all image blocks. As a result, there is a savings in both horizontal and vertical IDCT operations. When there is no horizontal downsizing, vertical DCT operations skipped for the inter-coded image blocks only, to avoid significant image distortion. When there is no vertical downsizing, the number of skipped horizontal DCT operations (such as in FIG. 6b) can be made less than in the vertical downsizing example (such as FIG. 6a).

Figure 7:
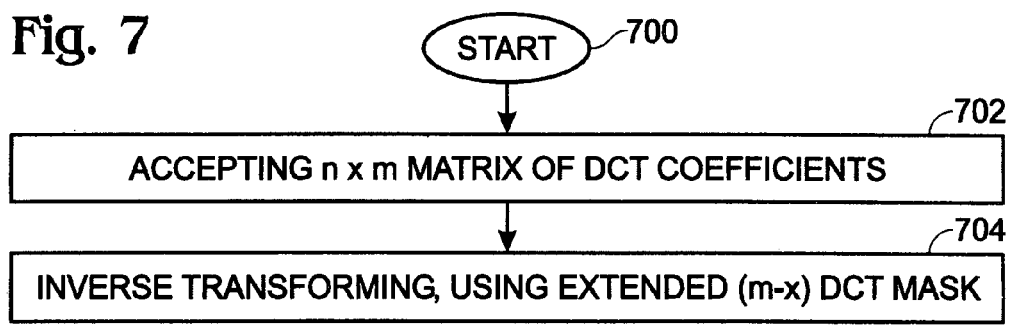
FIG. 7 is a flowchart illustrating the present invention method for reducing IDCT calculations in video decoding.

FIG. 7 is a flowchart illustrating the present invention method for reducing IDCT calculations in video decoding. Although the method, and the methods described by FIGS. 8-11, is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 700.

Step 702 accepts an n×m matrix of DCT coefficients. Step 704, using an extended (n−y)×(m−x) DCT mask, inverse transforms the DCT coefficients, where x is greater than, or equal to 0, and y is greater than 0.

In some aspects of the method, accepting an n×m matrix of DCT coefficients in Step 702 includes n=m=8. In other aspects, inverse transforming the DCT coefficients using an extended (n−y)×(m−x) DCT mask in Step 704 includes using a mask with all the n DCT coefficients in the first column of the n×m matrix.

Figure 8:
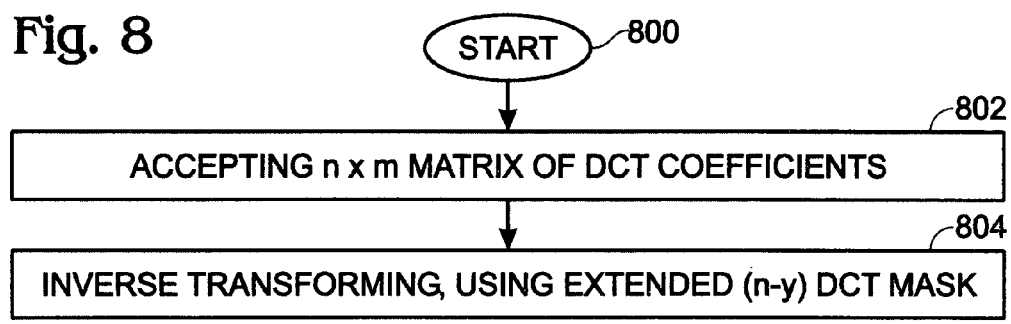
FIG. 8 is a flowchart illustrating a second aspect of the present invention method for reducing IDCT calculations in video decoding.

FIG. 8 is a flowchart illustrating a second aspect of the present invention method for reducing IDCT calculations in video decoding. The method starts at Step 800. Step 802 accepts an n×m matrix of DCT coefficients. Step 804, using an extended (n−y)×(m−x) DCT mask, inverse transforms the DCT coefficients, where x is greater than 0, and y is greater than, or equal to 0.

In some aspects, accepting an n×m matrix of DCT coefficients in Step 802 includes n=m=8. In other aspects, inverse transforming the DCT coefficients using an extended (n−y)×(m−x) DCT mask in Step 804 includes using a mask with all the m DCT coefficients in the first row of the n×m matrix.

FIG. 9 is a flowchart illustrating a third aspect of the present invention method for reducing IDCT calculations in video decoding. The method starts at Step 900. Step 902 accepts an n×m matrix of DCT coefficients. In some aspects, accepting an n×m matrix of DCT coefficients in Step 902 includes n=m=8. However, the method is not limited to any particular values for m and/or n. Step 904 performs (n−y) horizontal IDCT operations, where y is greater than 0. Step 906 performs y scaling operations. Step 908 performs (m−z) vertical IDCT operations, where z is in the range between 0 and m/2. Step 910 generates an n×m block of pixel information in response to the horizontal operations and the vertical IDCT operations.

In some aspects of the method, performing (n−y) horizontal ICDT operations in Step 904 includes performing IDCT operations for the first (n−y) horizontal rows. Then, performing y scaling operations in Step 906 includes substeps. Step 906a selects the DC component from the first position of each horizontal row. Step 906b scales the selected DC component. Step 906c copies the scaled DC component into the remaining positions of each of horizontal row.

In other aspects, performing (m−z) vertical IDCT operations in Step 908 includes substeps. Step 908a performs IDCT operations on alternate vertical columns. Step 908b copies the results of adjacent vertical column IDCT operation into each higher order vertical column, assuming that a higher order vertical column exists. Typically, performing IDCT operations on alternate vertical columns includes performing IDCT operations on the first vertical column, and every other vertical column after the first vertical column.

Some aspects of the method include further steps, not shown. Step 912 accepts an a×b matrix of DCT coefficients, where a<n and b<m. Step 914 performs a IDCT horizontal row operations. Step 916 performs b IDCT vertical column operations. Step 918 generates an a×b block of pixel information. Thus, the present invention permits the use of conventional IDCT decoding processes, within the context of the present invention. In this example the smaller matrix (a×b) of DCT coefficients necessarily results in a smaller number of IDCT operations (a+b), even when all the possible IDCT operations are performed.

In other aspects, a further step, Step 903a, identifies that the accepted n×m matrix has been encoded using an intra-coding process. Then, Step 903b selects the value of z in response to identifying the intra-coding process. Alternately, Step 903a identifies that the accepted n×m matrix has been encoded using an inter-coding process and Step 903b selects the value of z in response to identifying the inter-coding process.

In some aspects, Step 903a identifies the accepted n×m matrices as being encoded with an inter-coding and/or intra-coding process. Then, Step 903b includes substeps. Step 903b1 selects a first value of z in response to identifying an n×m matrix encoded using the inter-coding process. Step 903b2 selects a second value of z in response to identifying an n×m matrix encoded using the intra-coding process. Thus, the present invention method is applicable to decoding images that include section encoded with both intra-coding, along with other section encoded with inter-coding.

FIG. 10 is a flowchart illustrating a fourth aspect of the present invention method for reducing IDCT calculations in video decoding. The method starts at Step 1000. Step 1002 accepts an n×m matrix of DCT coefficients. In some aspects, accepting an n×m matrix of DCT coefficients includes n=m=8. However, the method is not limited to any particular values. Step 1004 performs (m−x) vertical IDCT operations, where x is greater than 0. Step 1006 performs x scaling operations. Step 1008 performs (n−z) horizontal IDCT operations, where z is in the range between 0 and n/2. Step 1010 generates an n×m block of pixel information in response to the vertical operations and the horizontal IDCT operations. In some aspects of the invention (not shown), a further step, Step 1007 sets z=n/2.

In some aspects, performing (m−x) vertical ICDT operations in Step 1004 includes performing IDCT operations for the first (m−x) vertical columns. Then, performing x scaling operations in Step 1006 includes substeps. Step 1006a selects the DC component from the first position of each vertical column. Step 1006b scales the selected DC component. Step 1006c copies the scaled DC component into the remaining positions of each of vertical column.

In other aspects, performing (n−z) horizontal IDCT operations in Step 1008 includes substeps. Step 1008a performs IDCT operations on alternate horizontal rows. Step 1008b copies the results of adjacent horizontal row IDCT operation into each higher order horizontal row. In some aspects, performing IDCT operations on alternate horizontal rows (Step 1008b) includes performing IDCT operations on the first horizontal row.

Figure 11:
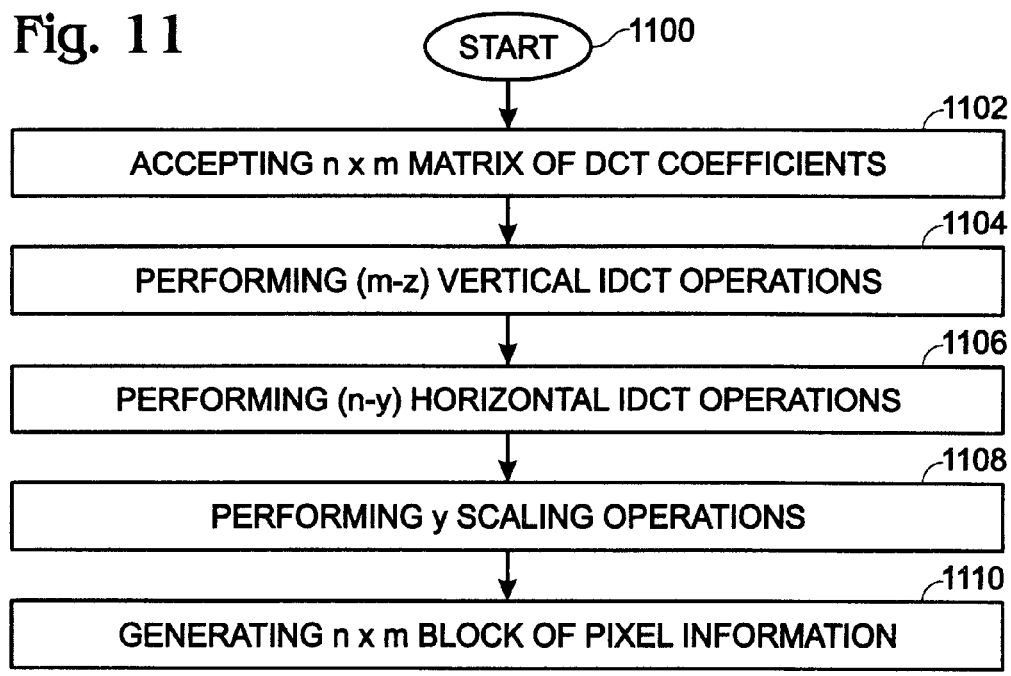
FIG. 11 is a flowchart illustrating a fifth aspect of the present invention method for reducing IDCT calculations in video decoding.

FIG. 11 is a flowchart illustrating a fifth aspect of the present invention method for reducing IDCT calculations in video decoding. The method starts at Step 1100. Step 1102 accepts an n×m matrix of DCT coefficients. In some aspects, accepting an n×m matrix of DCT coefficients includes n=m=8. However, the method is not limited to any particular values. Step 1104 performs (m−z) vertical IDCT operations, where z is greater than 0. Step 1106 performing (n−y) horizontal IDCT operations, where y is greater than 0. Step 1008 performs y scaling operations. Step 1110 generates an n×m block of pixel information in response to the vertical operations and the horizontal IDCT operations.

In some aspects, performing (n−y) horizontal ICDT operations in Step 1106 includes performing IDCT operations for the first (n−y) horizontal rows. Then, performing y scaling operations in Step 1108 includes substeps (not shown). Step 1108a selects the DC component from the first position of each horizontal row. Step 1108b scales the selected DC component. Step 1108c copies the scaled DC component into the remaining positions of each of horizontal row.

In other aspects, performing (m−z) vertical IDCT operations in Step 1104 includes substeps (not shown). Step 1104a performs IDCT operations on alternate vertical columns. Step 1104b copies the results of adjacent vertical column IDCT operation into each higher order vertical column. In some aspects, performing IDCT operations on alternate vertical columns includes performing IDCT operations on the first vertical column.

A method and DCT mask sets have provided to enable video decoding with a reduced number of IDCT operations. Examples have been given of specific row or column extensions, however, the invention is not limited to merely these examples. For example, an extended column need not necessary extend across all n rows of the matrix. Neither would an extended column necessarily have to be the first column. Other variations and embodiments of the invention will occur to those skilled in the art.

We claim:

1. A method for reducing inverse discrete cosine transform (IDCT) calculations in video decoding, the method comprising:
    accepting an n×m matrix of DCT coefficients;
    performing IDCT operations for the first (n−y) horizontal rows, where y is greater than 0;
    performing y scaling operations to the y rows of the n×m matrix of DCT coefficients, for which the IDCT operations are not performed, as follows:
        selecting a DC component from the first position of each horizontal row;
        scaling the selected DC component; and,
        copying the scaled DC component into the remaining positions of each of horizontal row; and,
    performing (m−z) vertical IDCT operations on the n×m block of pixel information generated by the horizontal operations, where z is in the range between 0 and m/2;
    generating an n×m block of pixel information in response to the horizontal and the vertical IDCT operations.

2. The method of claim 1 wherein performing (m−z) vertical IDCT operations includes:

performing IDCT operations on alternate vertical columns; and, into each higher order vertical column, copying the results of adjacent vertical column IDCT operation.

3. The method of claim 2 wherein performing IDCT operations on alternate vertical columns includes performing IDCT operations on the first vertical column.

4. The method of claim 3 wherein accepting an n×m matrix of DCT coefficients includes it n=m=8.

5. The method of claim 3 further comprising:

accepting an a×b matrix of DCT coefficients, where a<n and b<m;

performing a IDCT horizontal row operations;

performing b IDCT vertical column operations; and, generating an a×b block of pixel information.

6. The method of claim 1 further comprising:

identifying that the accepted n×m in matrix has been encoded using an intra-coding process; and, selecting the value of z in response to identifying the intra-coding process.

7. The method of claim 1 further comprising:

identifying that the accepted n×m matrix has been encoded using an inter-coding process; and, selecting the value of z in response to identifying the inter-coding process.

8. The method of claim 1 further comprising:

identifying accepted n×m matrices as being encoded with a process selected from the group including inter-coding and intra-coding processes;

selecting the value of z as follows:

selecting a first value of z in response to identifying an n×m matrix encoded using the inter-coding process; and, selecting a second value of z in response to identifying an n×m matrix encoded using the intra-coding process.

* * * * *